United States Patent
Ueyama et al.

[11] Patent Number: 6,147,425
[45] Date of Patent: Nov. 14, 2000

[54] CONTROLLABLE MAGNETIC BEARING APPARATUS

[75] Inventors: Hirochika Ueyama, Hirakata; Atsushi Kubo, Matsubara, both of Japan

[73] Assignee: Koyo Seiko Co., Ltd., Osaka, Japan

[21] Appl. No.: 09/413,486

[22] Filed: Oct. 6, 1999

[30] Foreign Application Priority Data

Nov. 17, 1998 [JP] Japan .................................. 10-326894

[51] Int. Cl.$^7$ ........................................ H02K 7/09
[52] U.S. Cl. ............................ 310/90.5; 318/721
[58] Field of Search ................ 310/90.5, 90, 68 B; 318/721

[56] References Cited

U.S. PATENT DOCUMENTS

| | | | |
|---|---|---|---|
| 3,694,041 | 9/1972 | Studer | 310/90.5 |
| 5,053,662 | 10/1991 | Richter | 310/90.5 |
| 5,347,190 | 9/1994 | Lewis et al. | 310/90.5 |
| 5,471,106 | 11/1995 | Curtis et al. | 310/90.5 |
| 5,627,421 | 5/1997 | Miller et al. | 310/90.5 |
| 5,649,814 | 7/1997 | Lund-lack | 417/423.7 |
| 5,708,312 | 1/1998 | Rosen et al. | 310/90 |
| 5,818,137 | 10/1998 | Nichols et al. | 310/90.5 |
| 5,961,291 | 10/1999 | Sakagami et al. | 417/42 |
| 6,020,665 | 2/2000 | Maurio et al. | 310/90.5 |
| 6,049,148 | 4/2000 | Nichols et al. | 310/68 B |

FOREIGN PATENT DOCUMENTS

| | | |
|---|---|---|
| 26 56 469 A1 | 6/1978 | Germany . |
| 08326750A | 12/1996 | Japan . |
| 09166138A | 7/1997 | Japan . |

Primary Examiner—Nestor Ramirez
Assistant Examiner—Joseph Waks
Attorney, Agent, or Firm—Jacobson, Price, Holman & Stern, PLLC

[57] ABSTRACT

In the magnetic bearing apparatus, there is provided a current sensor for detecting a current flowing in a motor. When the current increases over a reference value, a DSP enhances a support stiffness of the magnetic bearing, thereby securing a stable rotation of the rotor.

3 Claims, 2 Drawing Sheets

CONTROLLABLE MAGNETIC BEARING APPARATUS

FIELD OF THE INVENTION

The present invention relates to a controllable magnetic bearing apparatus for supporting a rotor of a rotating device such as a turbo molecular pump by a magnetic bearing in a non-contact manner and rotating the rotor at high speed.

DESCRIPTION OF THE PRIOR ART

The conventional controllable magnetic bearing apparatus detects a displacement of a rotor by a displacement sensor while the rotor is magnetically levitated by a magnetic bearing and rotated by a motor at high speed. Based on an output of the displacement sensor, the apparatus controls the magnetic bearing to perform position control for the rotor.

However, when a magnetic levitation force for the rotor becomes unstable in the conventional controllable magnetic bearing apparatus, the displacement sensor can not detect it as the unstable rotation. This may result in an undesirable state that the stable rotation of the rotor can not be secured.

OBJECT AND SUMMARY OF THE INVENTION

To overcome the above-mentioned shortcomings, an object of the present invention is to offer the controllable magnetic bearing apparatus which always secures the stable rotation of the rotor.

A controllable magnetic bearing apparatus of the present invention comprises:

a motor for rotating a rotor;

a magnetic bearing for supporting the rotor in a non-contact manner;

a displacement sensor for detecting a displacement of the rotor;

a current sensor for detecting a current supplied to the motor; and a controller for controlling the magnetic bearing in response to an output of the displacement sensor to perform position control for the rotor and controlling the magnetic bearing in response to an output of the current sensor to vary a support stiffness for the rotor.

According to the controllable magnetic bearing apparatus which was composed like the above, the controller performs ordinary position-control based on the output of the displacement sensor. Also, the controller takes into account of the output of the current sensor to control the magnetic bearing, thereby varying the support stiffness for the rotor in response to variation of load of the motor. Therefore, in case there occurs an increase of load for the motor that can not be detected only by the displacement detection, a magnetic levitation force is strengthened to thereby secure a stability of rotation of the rotor.

DESCRIPTION OF THE PREFERRED EMBODIMENTS

Hereafter, a preferred embodiment of the present invention will be described with reference to the accompanying drawings.

Figure 1:
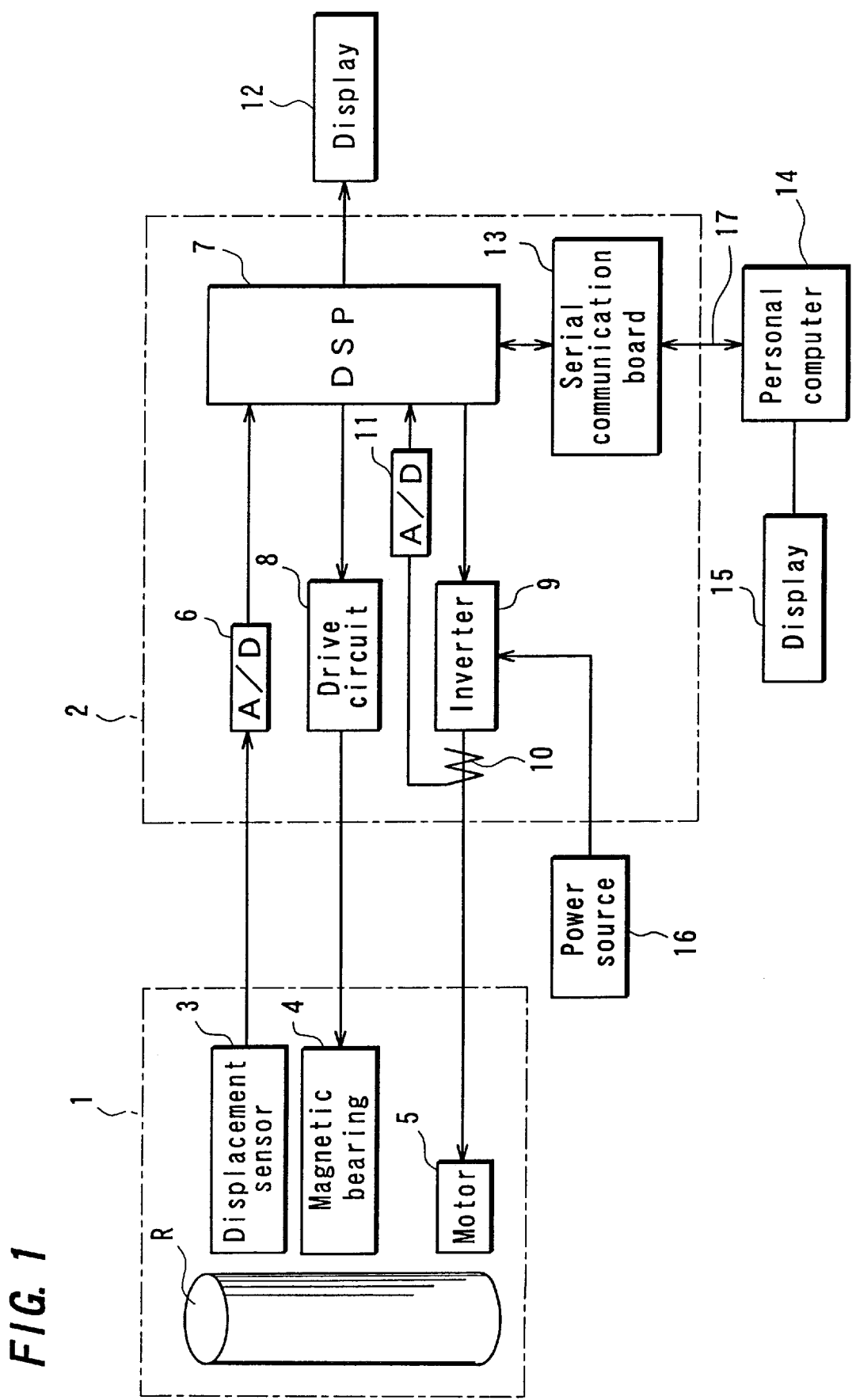
FIG. 1 is a block diagram of the controllable magnetic bearing apparatus in an embodiment of the present invention.

FIG. 1 is a block diagram showing composition of a controllable magnetic bearing apparatus in an embodiment of the present invention. The apparatus supports a rotor R that rotates at high speed in a device such as a turbo molecular pump. The apparatus is mainly composed of a machine body 1 which contains a rotor R, and a controller 2 electrically connected to the machine body 1.

The machine body 1 includes a displacement sensor 3 for detecting displacement of the rotor R, a magnetic bearing 4 for magnetically supporting the rotor R in a non-contact manner, and a motor 5 for rotating the rotor R. Generally, plural sensors 3 are provided for detection of displacement in a radial direction and an axial direction with respect to the rotor R. In the drawing, however, only one sensor 3 is shown for the simplicity of drawing.

The controller 2 includes a DSP (Digital Signal Processor) 7, an A/D converter 6, a drive circuit 8 for the magnetic bearing 4, an inverter 9, a current sensor 10, an A/D converter 11, and a serial communication board 13. The DSP 7 is programmable and is able to execute high-speed real-time processing. The A/D converter 6, the drive circuit 8, the inverter 9, the current sensor 10 via the A/D converter 11, and the serial communication board 13 are connected to the DSP 7.

Also, in FIG. 1, a display 12 is connected to the DSP 7. A motor current can be displayed on the display 12 in the real time. Therefore, the condition of the load of the motor 5 can be watched over by person. On the other hand, connection to a personal computer 14 through an RS232C communication line 17 from the serial communication board 13 makes it possible to display condition of the load of the motor 5 on a display 15 for the computer 14 in the real time. Therefore, the condition of the load of the motor 5 can be always watched over from the remote place.

The DSP 7 supplies the inverter 9 with a motor control signal, and thereby the inverter 9 drives the motor 5 so as to rotate it at a predetermined speed and generate a predetermined rotational torque. The inverter 9 receives the power from a power source 16. On the other hand, a plurality of displacement sensors 3 detect the displacement of the rotor R. Outputs of the displacement sensors 3 are converted into digital signals by the A/D converter 6, and the resultant digital signals are inputted to DSP 7. The DSP 7 executes the arithmetic processing (the PID calculation and so on) onto the digital signal at every predetermined sampling time. This processing is based on a predetermined control characteristic. The DSP 7 determines a control signal for the magnetic bearing 4 and issues it to the drive circuit 8. The drive circuit 8 drives the magnetic bearing 4 based on the control signal, thereby executing a position control for the rotor R.

Figure 2:
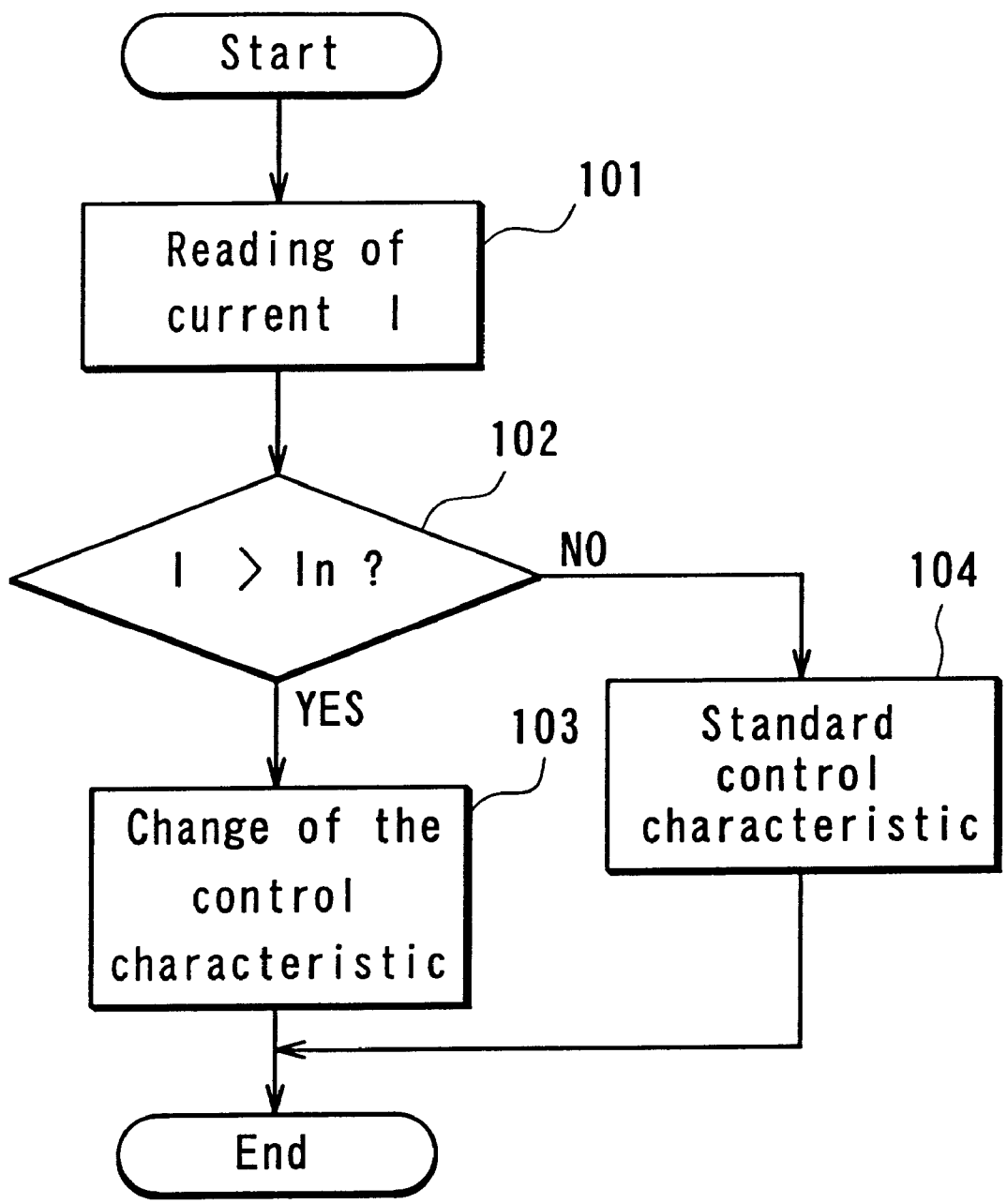
FIG. 2 is a flow chart showing a part of process that is periodically executed by a DSP shown in FIG. 1.

FIG. 2 is a flow chart showing a routine executed in the DSP 7 at every sampling time. Referring to FIG. 1 and FIG. 2, a current flowing in the motor 5 is detected by the current sensor 10. An output of the current sensor 10 is converted into a digital signal through the A/D converter 11, and thereafter the digital signal is inputted to the DSP 7 as a signal of current I. The DSP 7 reads the inputted current I at every sampling time (step 101). Supposing that a reference current when the motor 5 rotates at a predetermined speed is In, the DSP 7 judges whether or not the current I is larger than the reference current In (step 102). For example, when the magnetic levitation force becomes unstable thereby increasing the load of the motor 5, the current I becomes larger than the reference current In. At the step 102, when the current I is larger than the reference current In, the DSP 7 advances towards step 103. At this step 103, the control characteristic is changed, for instance, in proportion to I/In. Specifically, the DSP 7 controls a parameter of the aforementioned control characteristic in response to increase of the load of the motor 5, thereby raising again. As a result, the magnetic levitation force of the magnetic bearing 4 increases, and the support stiffness for the rotor R is improved. Therefore, the support of the rotor R becomes stable.

On the other hand, when the current I is not larger than the current In at step 102, the DSP 7 advances towards step 104 and maintains a standard control characteristic. When the control characteristic has been already changed, the DSP 7 returns to the standard control characteristic.

Based on the current I supplied to the motor 5, the magnetic levitation force is thus controlled in response to variation of the load of the motor 5 to change the support stiffness. Accordingly, the magnetic levitation force is always made stable.

Incidentally, apart from the above-mentioned configuration such that the current sensor 10 is provided on an interconnection line between the inverter 9 and the motor 5, the current sensor 10 may be included in the inverter 9. Also, the current sensor 10 may be provided outside the controller 2 on the above-mentioned interconnection line.

What is claimed is:

1. A controllable magnetic bearing apparatus comprising:
   a motor for rotating a rotor;
   a magnetic bearing for supporting said rotor in a non-contact manner;
   a displacement sensor for detecting a displacement of said rotor;
   a current sensor for detecting a current supplied to said motor; and
   a controller for controlling said magnetic bearing in response to an output of said displacement sensor to perform position control for said rotor and controlling said magnetic bearing in response to an output of said current sensor to vary a support stiffness for said rotor.

2. The controllable magnetic bearing apparatus in accordance with claim 1, further comprising
   a display for displaying information about a load of said motor based on an output of said current sensor, said display being connected to said controller.

3. The controllable magnetic bearing apparatus in accordance with claim 2, wherein
   said display is connected to said controller via a serial communication line.

* * * * *